(12) United States Patent
Patil et al.

(10) Patent No.: US 10,779,308 B2
(45) Date of Patent: Sep. 15, 2020

(54) PRIORITY BASED RESOURCE SELECTION IN A DEVICE-TO-DEVICE COMMUNICATION SYSTEM

(71) Applicant: QUALCOMM Incorporated, San Diego, CA (US)

(72) Inventors: Shailesh Patil, Raritan, NJ (US); Sudhir Kumar Baghel, Hillsborough, NJ (US); Kapil Gulati, Dover, DE (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 15/486,042

(22) Filed: Apr. 12, 2017

(65) Prior Publication Data

US 2018/0049220 A1 Feb. 15, 2018

Related U.S. Application Data

(60) Provisional application No. 62/373,912, filed on Aug. 11, 2016.

(51) Int. Cl.
*H04W 72/12* (2009.01)
*H04L 5/00* (2006.01)
(Continued)

(52) U.S. Cl.
CPC ....... *H04W 72/1247* (2013.01); *H04L 5/0062* (2013.01); *H04L 5/0064* (2013.01);
(Continued)

(58) Field of Classification Search
CPC . H04W 72/1247; H04L 5/0062; H04L 5/0064
See application file for complete search history.

(56) References Cited

U.S. PATENT DOCUMENTS

| 2004/0156313 | A1* | 8/2004 | Hofmeister | ......... H04L 12/4633 370/229 |
| 2016/0360435 | A1* | 12/2016 | Arzelier | ................ H04W 24/10 |
| 2017/0230939 | A1* | 8/2017 | Rudolf | .................. H04W 72/04 |

OTHER PUBLICATIONS

3GPP TSG RAN WG1 Meeting #85 Nanjing, China May 23-27, 2016, "LS on RAN1 agreements potentially related to RAN2 in sidelink-based V2V" (Year: 2016).*

(Continued)

*Primary Examiner* — Siming Liu
(74) *Attorney, Agent, or Firm* — Arent Fox LLP

(57) ABSTRACT

Methods and apparatuses for wireless communication are provided. The apparatus may be a user equipment (UE) integrated within a vehicle. In some aspects, the UE may receive sidelink control information (SCI) including at least one scheduling assignment and priority information. The UE may further select a transmission resource for transmission of data from a set of transmission resources based on one or both of the at least one scheduling assignment or the priority information. Additionally, the UE may transmit the data on the selected transmission resource. In some aspects, a UE may determine whether a priority level of data satisfies a priority level threshold. The UE may further transmit the data on the first transmission resource via a device-to-device (D2D) interface. Moreover, the UE may transmitting the data on at least one of the first transmission resource or a second transmission resource via a network entity interface.

54 Claims, 8 Drawing Sheets

(51) Int. Cl.
*H04W 72/04* (2009.01)
*H04W 92/18* (2009.01)
(52) U.S. Cl.
CPC ... *H04W 72/0426* (2013.01); *H04W 72/0473* (2013.01); *H04L 5/0007* (2013.01); *H04L 5/0044* (2013.01); *H04W 92/18* (2013.01)

(56) References Cited

OTHER PUBLICATIONS

Partial International Search Report—PCT/US2017/041730—ISA/EPO—dated Oct. 9, 2017.
RAN WG1: "LS on RAN1 Agreements Potentially Related to RAN2 in Sidelink-Based V2V", 3GPP Draft; R1-165965, LS to RAN2 and RAN4 V3, 3rd Generation Partnership Project (3GPP), vol. RAN WG1, No. Nanjing. China; May 23, 2016-May 27, 2016, Jun. 3, 2016 (Jun. 3, 2016), XP051112246, 4 Pages, Retrieved from the Internet: URL: http://www.3gpp.org/ftp/tsg_ran/WG1_RL1/TSGR1_85/LS/Outgoing/ [retrieved on Jun. 3, 2016].
Samsung: "Priority Handling for UE Autonomous Resource Selection", 3GPP Draft; R1-164761, Priority Handling for UE Autonomous Resource Selection, 3rd Generation Partnership Project (3GPP), vol. RAN WG1, No. Nanjing; May 23, 2016-May 27, 2016, May 13, 2016 (May 13, 2016), XP051096712, 5 Pages, Retrieved from the Internet: URL: http://www.3gpp.org/ftp/tsg_ran/WG1_RL1/TSGR1_85/Docs/ [retrieved on May 13, 2016].
ZTE: "Coexistence of PC5-based V2V Operation and Legacy Uu Operation", 3GPP Draft; R1-164967—Coex of PC5-Based V2V Ope and Legacy Uu Ope, 3rd Generation Partnership Project (3GPP), Mobile Competence Centre; 650, Route Des Lucioles; F-06921 Sophia-Antipolis Cedex ; FR, vol. RAN WG1, No. Nanjing, China; May 23, 2016-May 27, 2016 May 13, 2016 (May 13, 2016), XP051096796, Retrieved from the Internet: URL: http://www.3gpp.org/ftp/tsg_ran/WG1_RL1/TSGR1_85/Docs/ [retrieved on May 13, 2016], pp. 1-3.
International Search Report and Written Opinion—PCT/US2017/041730—ISA/EPO—dated Jan. 24, 2018.
NTT Docomo: "Details of Prioritizing Sidelink Transmissions Over UL Transmissions", 3GPP Draft; R1-165197 SL Priorizing Over UL, 3rd Generation Partnership Project (3GPP), Mobile Competence Centre ; 650, Route Des Lucioles; F-06921 Sophia-Antipolis Cedex; France, vol. RAN WG1, No. Nanjing, China; May 23, 2016-May 27, 2016 May 14, 2016 (May 14, 2016), XP051096216, pp. 1-3, Retrieved from the Internet: URL: http://www.3gpp.org/ftp/tsg_ran/WG1_RL1/TSGR1_85/Docs/ [retrieved on May 14, 2016].

* cited by examiner

PRIORITY BASED RESOURCE SELECTION IN A DEVICE-TO-DEVICE COMMUNICATION SYSTEM

CROSS-REFERENCE TO RELATED APPLICATION(S)

This application claims the benefit of U.S. Provisional Application Ser. No. 62/373,912, entitled "PRIORITY BASED RESOURCE SELECTION IN A DEVICE-TO-DEVICE COMMUNICATION SYSTEM" and filed on Aug. 11, 2016, which is expressly incorporated by reference herein in its entirety.

BACKGROUND

The present disclosure relates generally to communication systems, and more particularly, to priority based resource selection in a device-to-device (D2D) communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Additionally, LTE-based communication systems that reduce network deployment and operational costs may employ D2D communication. Specifically, D2D communication may be used to further boost network capacity. D2D communication may refer to a communication scheme between two or more user equipments (UEs) that may not include, or operate independent of, an access point (AP) or base station in facilitating or establishing a communication link between or among the UEs. In some aspects, D2D communication may also called proximity service (ProSe) communication. For instance, proximity service identifies a UE that is in proximity of another UE. However, there currently exists limitations in D2D communication with respect to transmissions on or using one or more resources.

As such, systems and methods that effectively communicate using such resources may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided for wireless communication at a user equipment (UE). The method includes receiving sidelink control information (SCI) including at least one scheduling assignment and priority information. The method further includes selecting a transmission resource for transmission of data from a set of transmission resources based on one or both of the at least one scheduling assignment or the priority information. Additionally, the method includes transmitting the data on the selected transmission resource.

In an aspect of the disclosure, an apparatus for wireless communication includes means for receiving SCI including at least one scheduling assignment and priority information. The apparatus further includes means for selecting a transmission resource for transmission of data from a set of transmission resources based on one or both of the at least one scheduling assignment or the priority information. Additionally, the apparatus includes means for transmitting the data on the selected transmission resource.

In an aspect of the disclosure, a computer-readable medium storing computer executable code for wireless communication includes code for receiving SCI including at least one scheduling assignment and priority information. The computer-readable medium further includes code for selecting a transmission resource for transmission of data from a set of transmission resources based on one or both of the at least one scheduling assignment or the priority information. Additionally, the computer-readable medium includes code for transmitting the data on the selected transmission resource.

In an aspect of the disclosure, an apparatus for wireless communication includes a memory and at least one processor communicatively coupled to the memory. The at least one processor configured to receive SCI including at least one scheduling assignment and priority information. The at least one processor is further configured to select a transmission resource for transmission of data from a set of transmission resources based on one or both of the at least one scheduling assignment or the priority information. Additionally, the at least one processor is configured to transmit the data on the selected transmission resource.

In an aspect of the disclosure, a method is provided for resource transmission at a UE. The method includes determining a priority level of data for transmission on a first transmission resource. The method further includes determining whether the priority level of the data satisfies a priority level threshold. Additionally, the method includes transmitting the data on the first transmission resource via a device-to-device (D2D) interface based on determining that the priority level of the data satisfies a priority level threshold. Moreover, the method includes transmitting the data on at least one of the first transmission resource or a second transmission resource via a network entity interface based on determining that the priority level of the data does not satisfy the priority level threshold.

In an aspect of the disclosure, an apparatus for resource transmission includes means for determining a priority level of data for transmission on a first transmission resource. The apparatus further includes means for determining whether the priority level of the data satisfies a priority level threshold. Additionally, the apparatus includes means for transmitting the data on the first transmission resource via a D2D interface based on determining that the priority level of the data satisfies a priority level threshold. Moreover, the apparatus includes means for transmitting the data on at least one of the first transmission resource or a second transmission resource via a network entity interface based on determining that the priority level of the data does not satisfy the priority level threshold.

In an aspect of the disclosure, a computer-readable medium storing computer executable code for resource transmission includes code for determining a priority level of data for transmission on a first transmission resource. The computer-readable medium further includes code for determining whether the priority level of the data satisfies a priority level threshold. Additionally, the computer-readable medium includes transmitting the data on the first transmission resource via a D2D interface based on determining that the priority level of the data satisfies a priority level threshold. Moreover, the computer-readable medium includes transmitting the data on at least one of the first transmission resource or a second transmission resource via a network entity interface based on determining that the priority level of the data does not satisfy the priority level threshold.

In an aspect of the disclosure, an apparatus for resource transmission includes a memory and at least one processor communicatively coupled to the memory. The at least one processor is configured to determine a priority level of data for transmission on a first transmission resource. The at least one processor is further configured to determine whether the priority level of the data satisfies a priority level threshold. Additionally, the at least one processor is configured to transmit the data on the first transmission resource via a D2D interface based on determining that the priority level of the data satisfies a priority level threshold. Moreover, the at least one processor is configured to transmit the data on at least one of the first transmission resource or a second transmission resource via a network entity interface based on determining that the priority level of the data does not satisfy the priority level threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
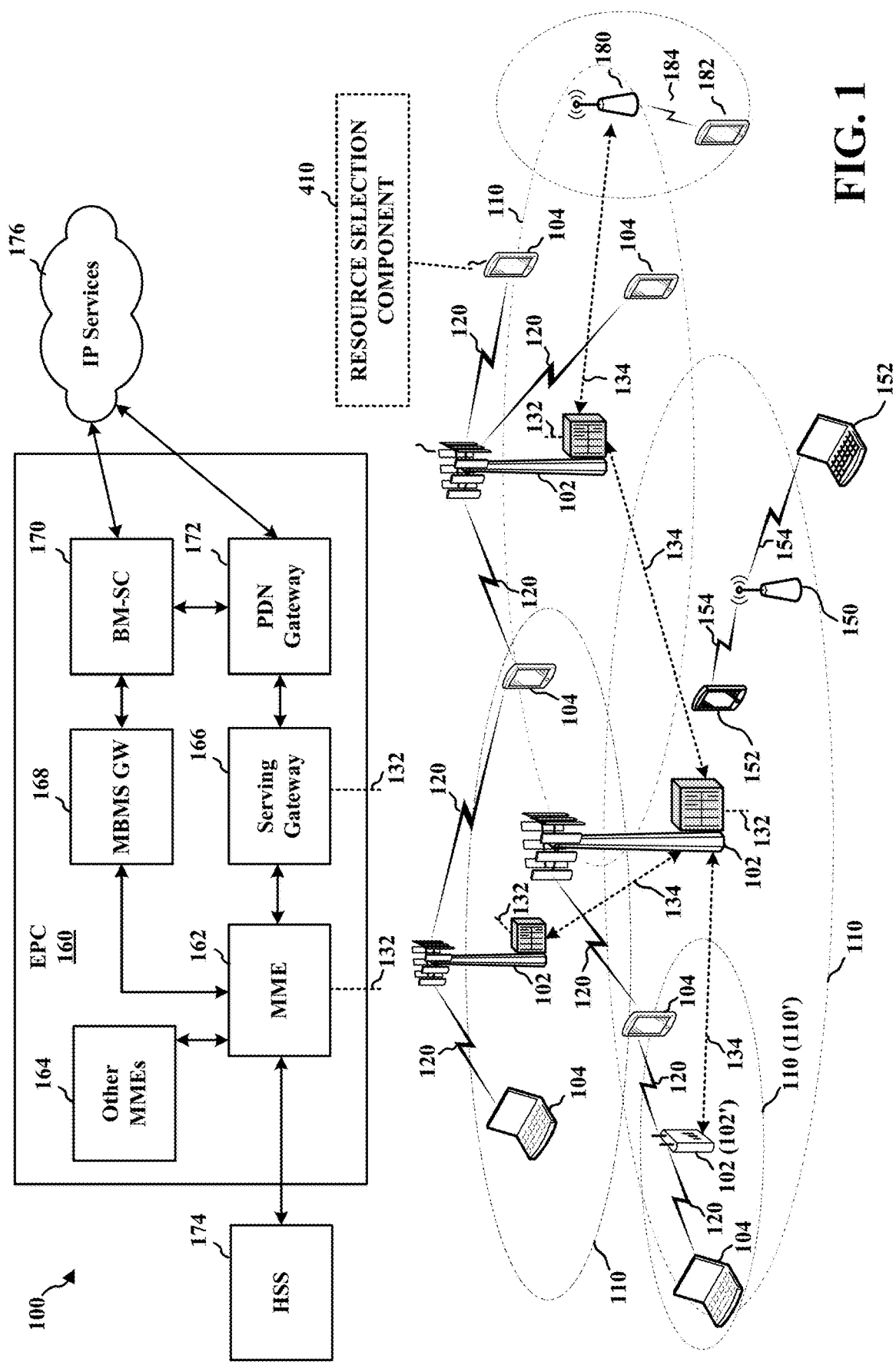
FIG. 1 is a diagram illustrating an example of a wireless communications system and an access network in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may include resource selection component 410, which may be configured to select one or more transmission resources from a set or pool of transmission resources for transmission of data to one or more UEs in a D2D communication environment.

Figure 2:
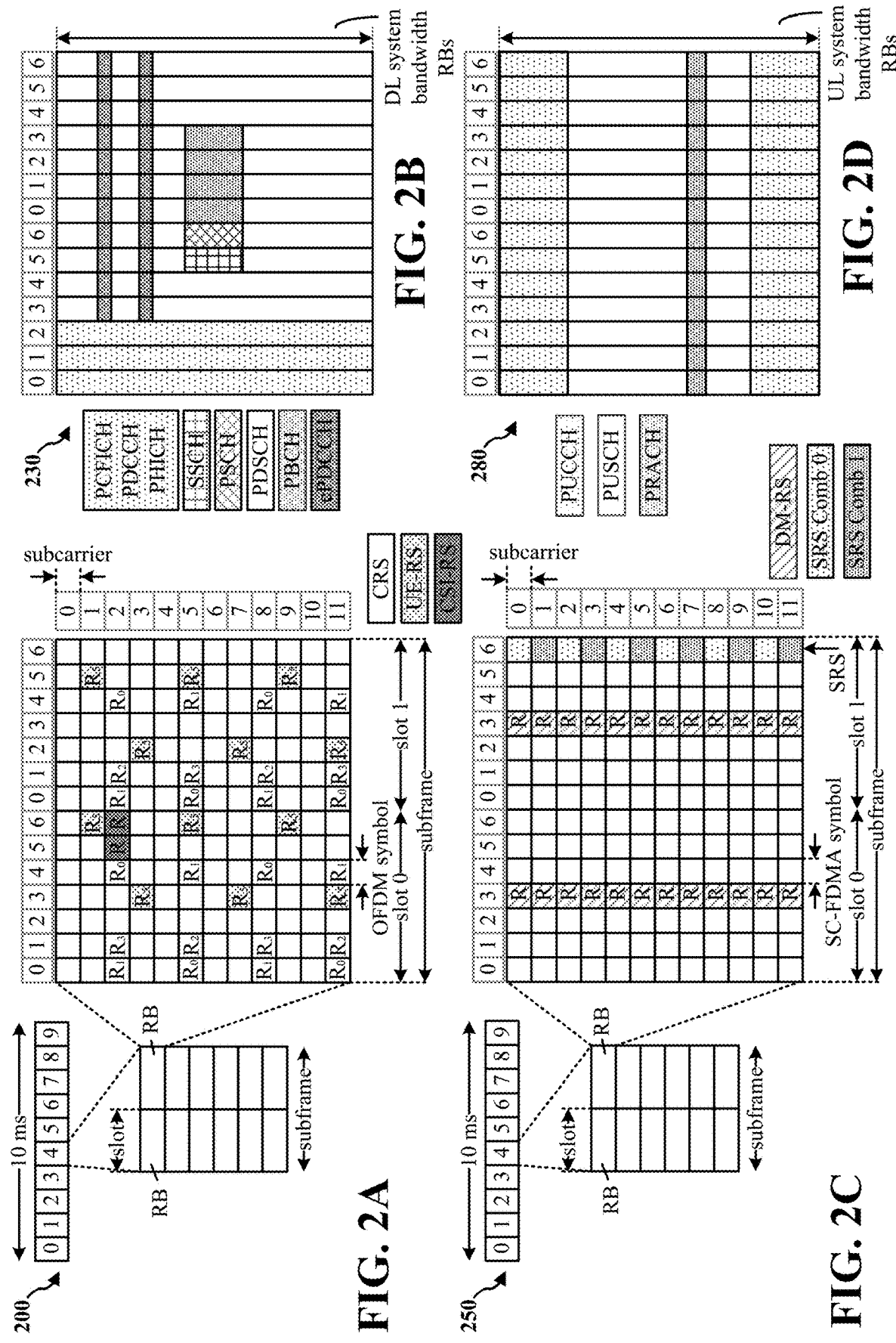
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. For example, a UE such as UE 110 (FIG. 1) including resource selection component 410 (FIGS. 1 and 4) may communicate with another device (e.g., another UE) and/or network entity (e.g., base station 120, FIG. 1) in accordance with the aspects of one or more of FIGS. 2A-2D. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
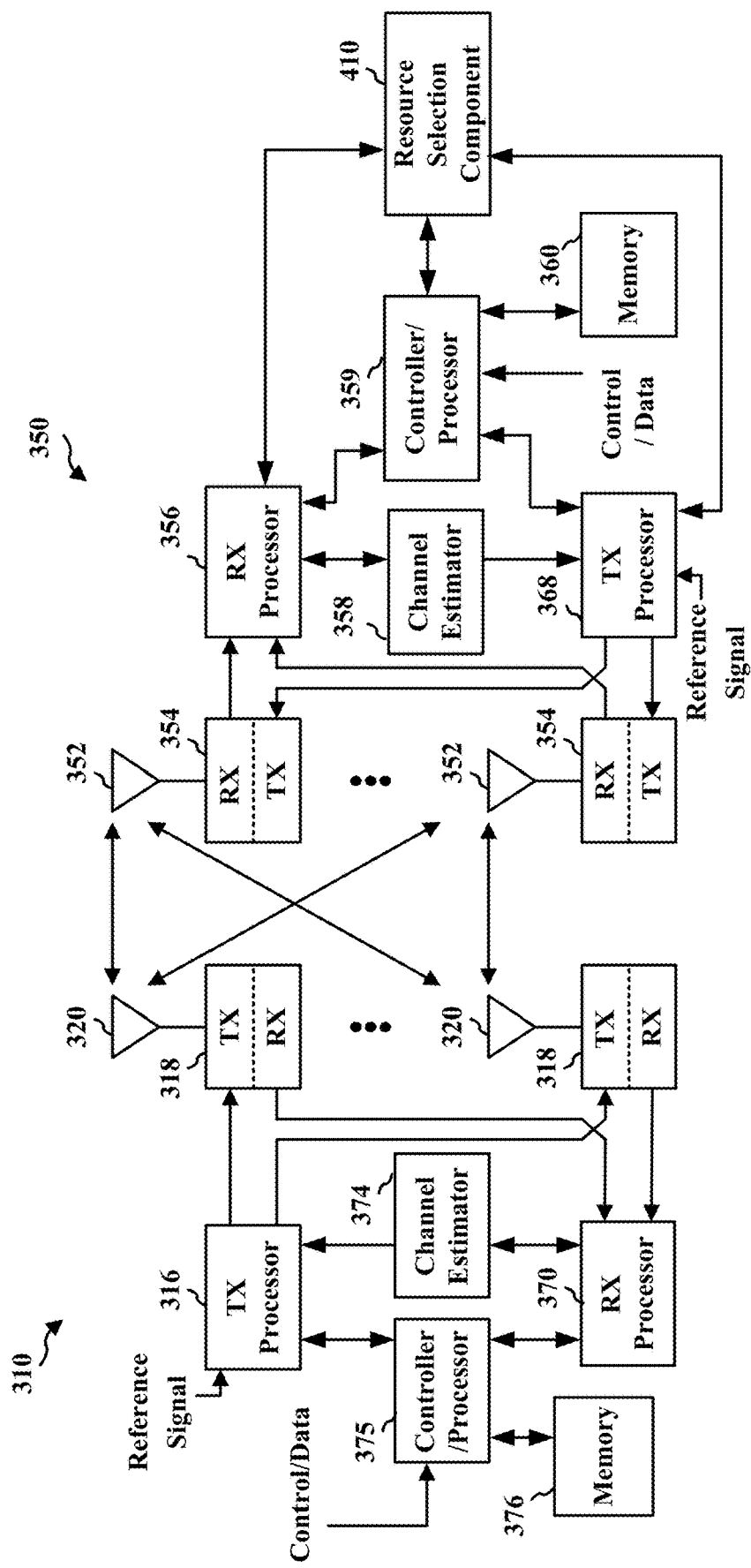
FIG. 3 is a diagram illustrating an example of an evolved Node B (eNB) and user equipment (UE) in an access network, and in accordance with some aspects of the present disclosure.

FIG. 3 is a block diagram of an eNB 310 in communication with a UE 350 including the resource selection component 410, which may be configured to select one or more transmission resources from a set or pool of transmission resources for transmission of data to one or more UEs in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
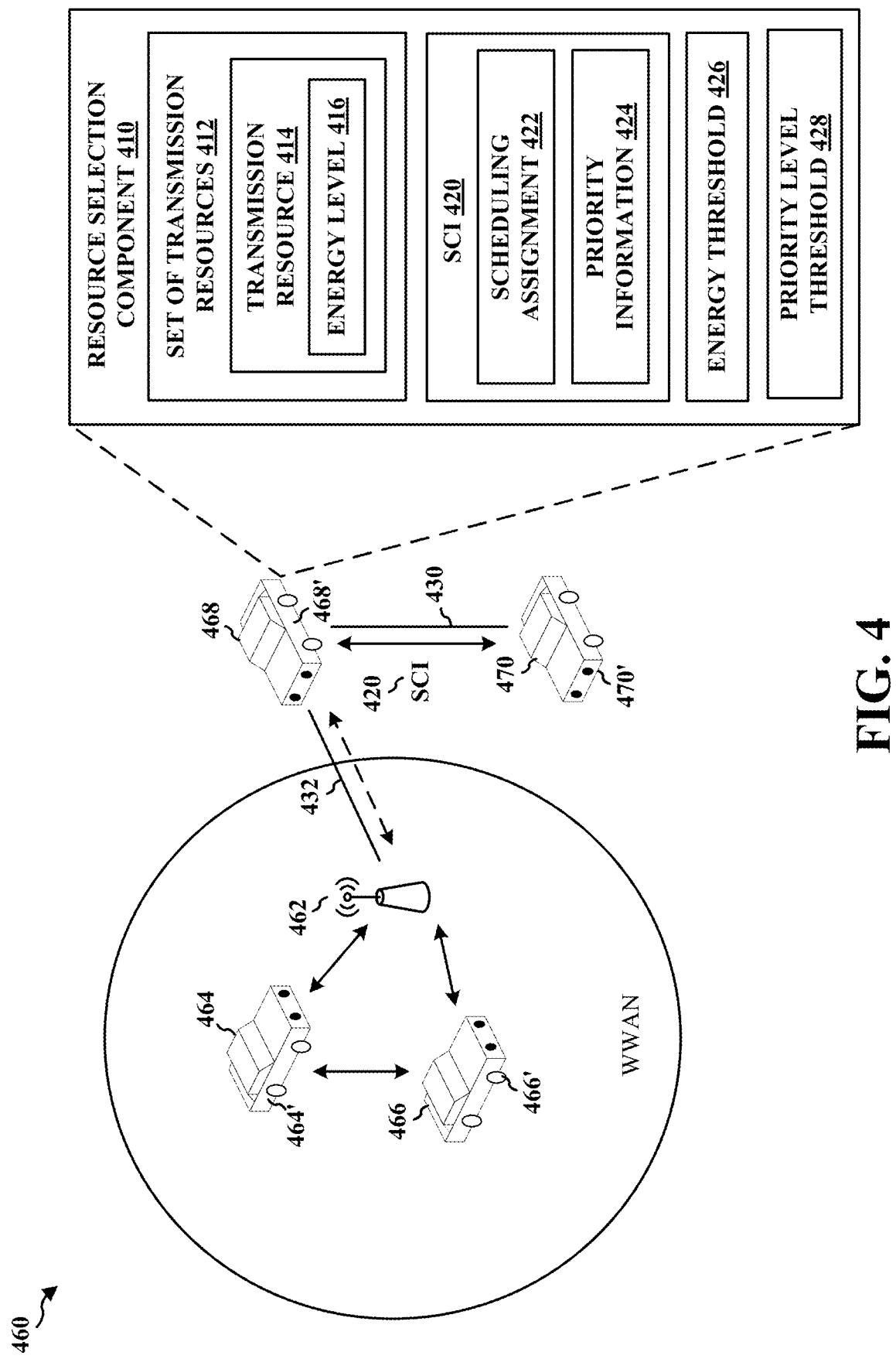
FIG. 4 is a diagram of resource selection and transmission within a device-to-device communications system in accordance with some aspects of the present disclosure.

FIG. 4 is a diagram of a device-to-device (D2D) communications system 460. The D2D communications a system 460 includes a plurality of vehicles 464, 466, 468, 470 each of which may include respective UEs 464', 466', 468', 470'. The D2D (or vehicle-to-vehicle) communications system 460 may overlap with a cellular communications system, such as for example, a WWAN. Some of the UEs 464', 466', 468', 470' may communicate together in D2D communication using the DL/UL WWAN spectrum, some of the UEs may communicate with the base station 462, and some of the UEs may do both. For example, as shown in FIG. 4, the UEs 468', 470' are in D2D communication and the UEs 464', 466' are in D2D communication. The UEs 464', 466' are also communicating with a network entity, e.g., the base station 462. The D2D communication may be through one or more sidelink channels, such as a physical sidelink broadcast channel (PSBCH), a physical sidelink discovery channel (PSDCH), a physical sidelink shared channel (PSSCH), and/or a physical sidelink control channel (PSCCH).

In an example, the vehicle 468 may include or otherwise have integrated therein, UE 468', which may include the resource selection component 410. In some aspects, the resource selection component 410 may facilitate vehicle-to-vehicle (V2V) communication based on, for example, autonomous selection of one or more resources such as a transmission resource 414 from a set of transmission resources 412 for communication of data (e.g., data packets). Specifically, to effectively select the transmission resource 414, the resource selection component 410 may utilize or otherwise take into account the scheduling assignment 422 and/or the priority information 424 contained within the sidelink control information (SCI) 420 received from, for example, another UE of a vehicle (e.g., UE 470' of vehicle 470). By utilizing the scheduling assignment 422 and/or the priority information 424, the UE 468' of the vehicle 468 may avoid selection of one or more transmission resources that have already been selected by or reserved for communication by or for another UE (e.g., UE 470'). In some aspects, the SCI 420 and the scheduling assignment 422 may be considered the same entity, and as such, may be used interchangeably. That is, in such aspect, the scheduling assignment 422 may be decoded to obtain at least the priority information 424.

In particular, the UE 468' may be configured to receive, via broadcast on PSBCH for example, the SCI 420 from another UE such as the UE 470'. The SCI 420 may include, among other data, one or both of the scheduling assignment 422 and/or the priority information 424. In some aspects, the scheduling assignment 422 may include or otherwise correspond to control information that specifies one or more resources (e.g., resource blocks) that have been selected or reserved by or for communication by the UE 470'. Further, the priority information 424 may include or otherwise correspond to one or more priority levels associated with the data communicated by the UE 470' within the allocated/reserved resources.

Further, the UE 468', via the resource selection component 410, may be configured to select the transmission resource 414 based on one or both of the scheduling assignment 422 and/or the priority information 424. In some aspects, the priority information 424 may include a first priority level associated with an energy threshold 426 representing a minimum energy level that indicates allocation or use of at least one resource by another UE. For example, the resource selection component 410 may be configured to determine and use an energy level 416 associated with the transmission resource 414 or the scheduling assignment 422 in determining whether to select and transmit on that particular transmission resource 414. Specifically, for instance, the resource selection component 410 may be configured to determine whether the energy level 416 satisfies (e.g., falls below) the energy threshold 426. Accordingly, resource selection component 410 may be configured to select the transmission resource 414 for transmission of the data based on a determination that the energy level 416 satisfies (e.g., falls below) the energy threshold 426.

However, in some aspects, the resource selection component 410 may be configured to forego selection of the transmission resource 414 for transmission of the data based on a determination that the energy level 416 does not satisfy (e.g., meets or exceeds) the energy threshold 426. In some aspects, the energy threshold 426 may represent or otherwise be indicative of whether a resource such as the transmission resource 414 is being used or reserved by another entity such as the UE 470'. In some aspects, the energy level 416 and/or the energy threshold 426 may correspond to a reference signal power level (e.g., DM-RS) or an estimated energy in the transmission resource 414. Further, the resource selection component 410 may be configured to select the transmission resource 414 irrespective of the first priority level exceeding a priority level of the UE 468' (e.g., or more specifically, of the data to be transmitted by the UE 468'). That is, even though the first priority level may indicate that the data from another UE has priority over or is prioritized over the data of the UE, the UE 468' may nonetheless transmit on the transmission resource 414 based on a determination that the transmission resource 414 is available for transmission (e.g., corresponding energy level 416 satisfies energy threshold 426).

In other words, the UE 468' may exclude transmission resources (e.g., resource blocks) at least based on scheduling assignment 422 decoding. For example, in some aspects, the transmission resource 414 may be excluded if the resource selection component 410 determines that the transmission resource 414 is indicated as or reserved by a decoded scheduling assignment 422 and/or the received DM-RS power in the associated data resource is above the energy threshold 426. In some aspects, alternatively or in combination with the foregoing, the transmission resource 414 may be excluded if the resource selection component 410 determines that the transmission resource 414 is indicated as or reserved by decoded scheduling assignment 422 and the energy level 416 in the associated data/transmission resource estimated from the measurement in the scheduling assignment 422 resource is above the energy threshold 426.

Additionally, in some aspects, the resource selection component 410 may be configured to consider the priority levels of the data to be transmitted by the UE 468' and the data to be transmitted by UE 470'. For example, the resource selection component 410 may be configured to determine a second priority level from the priority information 424 and associated with a second transmission resource from the set of transmission resources 412. In some aspects, the set of transmission resources 412 may correspond to a PSSCH resource pool. Accordingly, the resource selection component 410 may be configured to select the transmission resource 414 based at least on the second priority level from the priority information 424. In some aspects, the first priority level or the second priority level may correspond to a lowest priority level or a highest priority level, of which the resource selection component 410 may be configured to forego selection of the transmission resources associated with at least one of the lowest priority level or a highest priority level.

As such, upon selection of the transmission resource 414 from the set of transmission resources 412, the resource selection component 410 may be configured to transmit the data (e.g., data packets) either directly to another UE such as UE 470' or via broadcast to one or more UEs such as the UEs 464', 470', and/or 466'. In some aspects, the UE 468' may transmit the data via or on the PSSCH. However, in doing so, the UE 468' may encounter a potential conflict on the transmission chain of the UE 468' between a D2D interface 430 (e.g., PC5) and a network entity interface 432 (e.g., Uu).

Specifically, for instance, to address the potential transmission conflict, and to select the proper interface to transmit the data, the resource selection component 410 may be configured to determine whether a priority level of the data for transmission by the UE 468' satisfies a priority level threshold 428. In some aspects, the priority level threshold 428 represents a minimum priority level such that data may be transmitted on or using the D2D interface 430. Further, the resource selection component 410 may be configured to transmit the data on the transmission resource 414 via a D2D interface 430 based on a determination that the priority level of the data satisfies (e.g., meets or exceeds) the priority level threshold 428. However, the resource selection component 410 may be configured to transmit the data on a second transmission resource via the network entity interface 432 based on a determination that the priority level of the data does not satisfy (e.g., falls below) the priority level threshold 428.

For example, the UE 468' may determine whether to use a transmit chain for a V2X PC5 transmission or a Uu transmission upon detecting a conflict. In some aspects, a minimum priority level may be pre-configured or RRC configured (e.g., using eNB). If a V2X PC5 packet being transmitted by the UE 468' is at or above the minimal priority, then the V2X PC5 transmission may be prioritized compared to Uu transmission, and vice versa. Further, when the PC5 transmission is prioritized, some subframes adjacent to or proximate the PC5 transmission may not be used for Uu transmission because of the time utilized for tuning and change of timing.

Further, in some aspects, to transmit the data on or using the second transmission resource associated with the network entity interface 432, the resource selection component 410 may be configured to determine whether the second transmission resource satisfies one or more latency criteria. In some aspects, the one or more latency criteria may be or otherwise include a minimum latency level for a particular channel. Additionally, in some aspects, UE 468' may be configured to receive (e.g., via unicast or broadcast), from the network entity, e.g., base station 462, a configuration message that indicates or otherwise configures the priority level threshold 428.

In some aspects, each priority level may be associated with or otherwise correspond to distinct energy threshold (e.g., including energy threshold 426). If the received energy associated with the scheduling assignment 422 is above the energy threshold 426 associated with priority level transmitted in the scheduling assignment 422, then the data/transmission resources associated with the scheduling assignment 422 may be excused or disregarded from consideration in resource (re)selection. That is, each priority level may have a distinct threshold level. As such, multiple energy thresholds may be utilized for each priority level.

In addition, in some aspects, as resource selection may be semi-persistent from the perspective of UE 468', the same transmission resource 414 may be used to transmit packets of different priority. For instance, if transmission resource 414 is ruled out, then some or all of the semi-persistent resources associated with the scheduling assignment 422 may be ruled out or discarded. Therefore, the UE 468' may use either the lowest or the highest priority observed from a given or another UE to rule out the transmission resource 414.

Moreover, in some aspects, during reselection, the UE 468' may listen for resources. While listening, the UE 468' may decode one or more scheduling assignments (e.g., which may or may not be on the same subframe) that reserve resources which may overlap with the UE's 468' current resources. The UE 468' may use the priority information 424 decoded from the scheduling assignment 422 and compare the priority information 424 with the priority information associated with another UE 469'. The UE 468' may determine whether to reselect based on correlating the priority information 424. For instance, if the priority of data transmitted on the current resources of the UE 468' is higher than the priority of the packet of the UE 468', then the UE 468' may reselect to the current resources, otherwise the UE 468' may not. The priority may be a maximum priority level, minimum priority level, or some other function over multiple semi-persistent periods.

The example methods and apparatuses discussed infra are applicable to any of a variety of wireless D2D communications systems, such as for example, a wireless device-to-device communication system based on LTE, V2X, VLinQ, FlashLinQ, WiMedia, Bluetooth, ZigBee, or Wi-Fi based on the IEEE 802.11 standard. To simplify the discussion, the example methods and apparatus are discussed within the context of LTE. However, one of ordinary skill in the art would understand that the example methods and apparatuses are applicable more generally to a variety of other wireless device-to-device communication systems.

Figure 5:
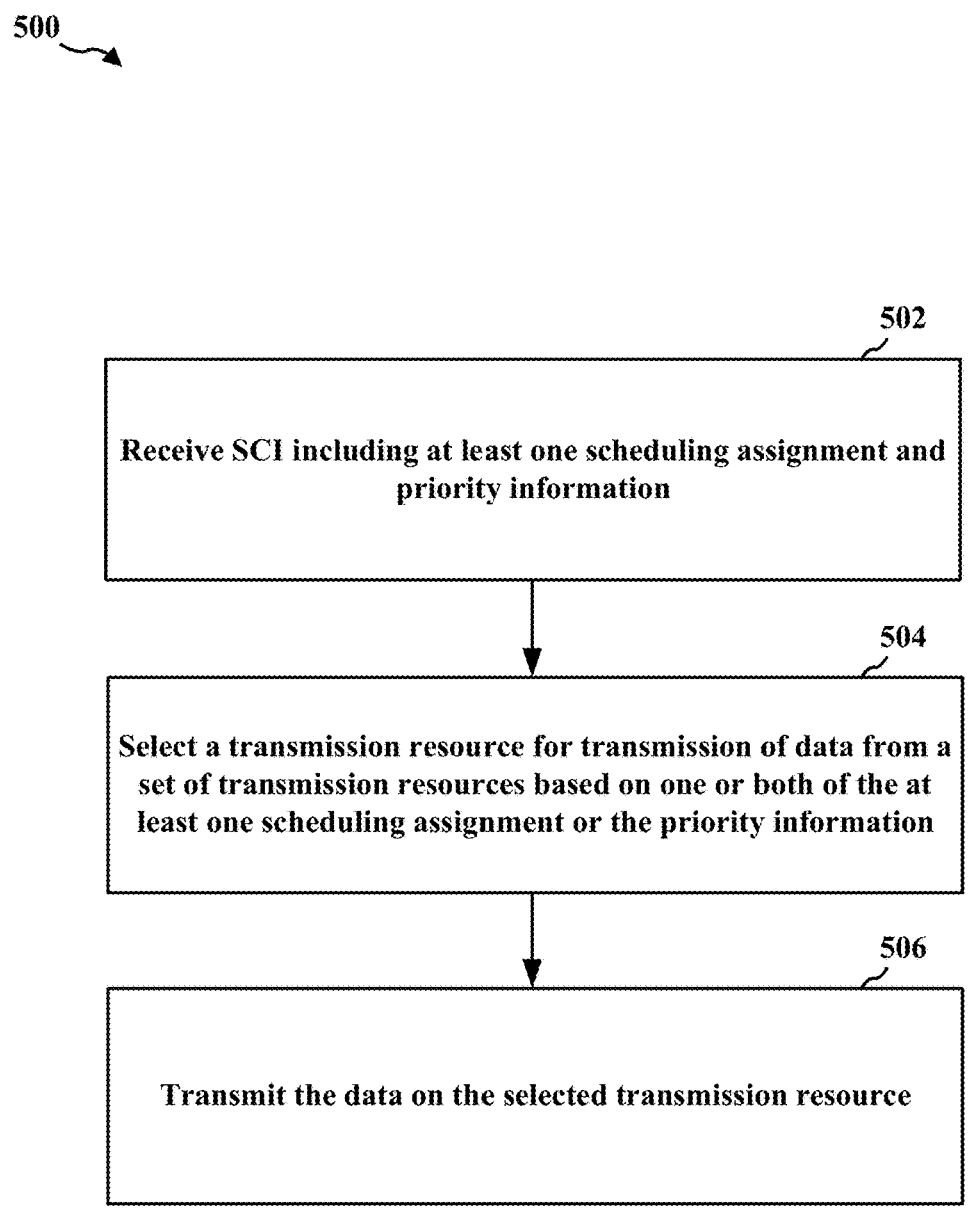
FIG. 5 is a flowchart of a method of wireless communication at a UE in accordance with some aspects of the present disclosure.

FIG. 5 is a flowchart 500 of a method of wireless communication at a UE. The method may be performed by a UE (e.g., UE 104, FIG. 1, UE 468', FIG. 4, and/or apparatus 802, FIG. 8). While, for purposes of simplicity of explanation, the method is shown and described as a series of acts, the method may not be limited by the order of acts, as some acts may, in accordance with one or more embodiments, occur in different orders and/or concurrently with other acts from that shown and described herein. For example, a method could alternatively be represented as a series of interrelated states or events, such as in a state diagram. Moreover, not all illustrated acts may be required to implement the method in accordance with one or more features described herein.

At block 502, the method 500 may receive SCI including at least one scheduling assignment and priority information. For example, in some aspects, the UE 468' (FIG. 4) may execute one or more components of a receiver chain to receive the SCI 420 (FIG. 4) including at least one scheduling assignment 422 (FIG. 4) and/or priority information 424 (FIG. 4). In some aspects, the set of transmission resources may correspond to a PSSCH transmission pool. Further, in some aspects, the UE may be integrated within a vehicle 468 (FIG. 4).

Further, at block 504, the method 500 may select a transmission resource for transmission of data from a set of transmission resources based on one or both of the at least one scheduling assignment or the priority information. For instance, in some aspects, the UE 468' may execute the resource selection component 410 (FIG. 4) to select a transmission resource 414 (FIG. 4) for transmission of data from a set of transmission resources 412 (FIG. 4) based on one or both of the at least one scheduling assignment 422 (FIG. 4) or the priority information 424 (FIG. 4).

In some aspects, the priority information may include a first priority level associated with an energy threshold 426 (FIG. 4). Further, in some aspects, selecting the resource may include determining an energy level of at least one of the transmission resource 414 (FIG. 4) or the scheduling assignment 422 (FIG. 4), determining whether the energy level of at least one of the transmission resource 414 (FIG. 4) or the scheduling assignment 422 (FIG. 4) satisfies the energy threshold, selecting the transmission resource 414 (FIG. 4) for transmission of the data based on determining that the energy level 416 (FIG. 4) satisfies (e.g., falls below) the energy threshold 426 (FIG. 4), and foregoing selection of the transmission resource 414 (FIG. 4) for transmission of the data based on determining that the energy level 416 (FIG. 4) does not satisfy (e.g., meets or exceeds) the energy threshold 426 (FIG. 4).

In some aspects, the energy level 416 (FIG. 4) may correspond to at least one of a reference signal power level (e.g., DM-RS) or an estimated energy in the transmission resource 414 (FIG. 4). Further, in some aspects, selecting the transmission resource 414 (FIG. 4) for transmission of the data may be based on determining that the energy level 416 (FIG. 4) satisfies the energy threshold 426 (FIG. 4) may include selecting the transmission resource 414 (FIG. 4) irrespective of the first priority level exceeding a priority level of the UE (e.g., UE 468', FIG. 6).

Additionally, in some aspects, although not shown, the method 500 may determine whether a first priority level associated with data of another UE and included within the priority information 424 (FIG. 4) is higher than a priority level associated with the data of the UE. Accordingly, based on the foregoing, selecting the transmission resource 414 (FIG. 4) may include selecting the transmission resource 414 (FIG. 4) for transmission of the data of the UE based on determining that the first priority level is lower than the priority level of the UE, and foregoing selection of the transmission resource 414 (FIG. 4) for transmission of the data by the UE based on determining that the first priority level is higher than the priority level of the UE. In some aspects, the first priority level may be ignored or disregarded based on a determination that the energy level 416 (FIG. 4) is below the energy threshold or does not satisfy the energy threshold 426 (FIG. 4).

Moreover, in some aspects, although not shown, the method 500 may determine a second priority level from the priority information 424 (FIG. 4) and associated with a second transmission resource from the set of transmission resources 412 (FIG. 4). Accordingly, based on the foregoing, selecting the transmission resource may further be based at least on the second priority level. In some aspects, at least one of the first priority level or the second priority level may correspond to a maximum priority level associated with another UE. Additionally, in some aspects, at least one of the first priority level or the second priority level may correspond to a minimum priority level associated with another UE.

Further, in some aspects, the transmission resource 414 (FIG. 4) may be selected for a time interval representing semi-persistent resource selection. For example, the UE 468' (FIG. 4) may transmit PSSCH (e.g., when data is available) on a selected set of periodically occurring resources until a resource reselection occurs. Accordingly, although not shown, the method 500 may select a second transmission resource from the set of transmission resources 412 (FIG. 4) after expiration of the time interval. In some aspects, selecting the transmission resource 414 (FIG. 4) may include autonomously selecting the transmission resource from the set of transmission resources 412 (FIG. 4) independent of a network entity, which in some aspects, may be an evolved Node B. In some aspects, selecting the transmission resource 414 (FIG. 4) from the set of transmission resources 412 (FIG. 4) may include selecting during at least one of a RRC idle state or an RRC connected state of the UE.

Additionally, at block 506, the method 500 may transmit the data on the selected transmission resource. For example, in some aspects, UE 468' may execute one or more components of a transmission chain to transmit the data on the selected transmission resource 414. In some aspects, transmitting the data on the transmission resources includes transmitting the data on a PSSCH.

In some aspects, although not shown, the method 500 may transmit or broadcast an SCI associated with the UE in response to selecting the transmission resource. For example, in some aspects, the SCI may be transmitted or broadcasted to one or more UEs on a PSCCH.

Figure 6:
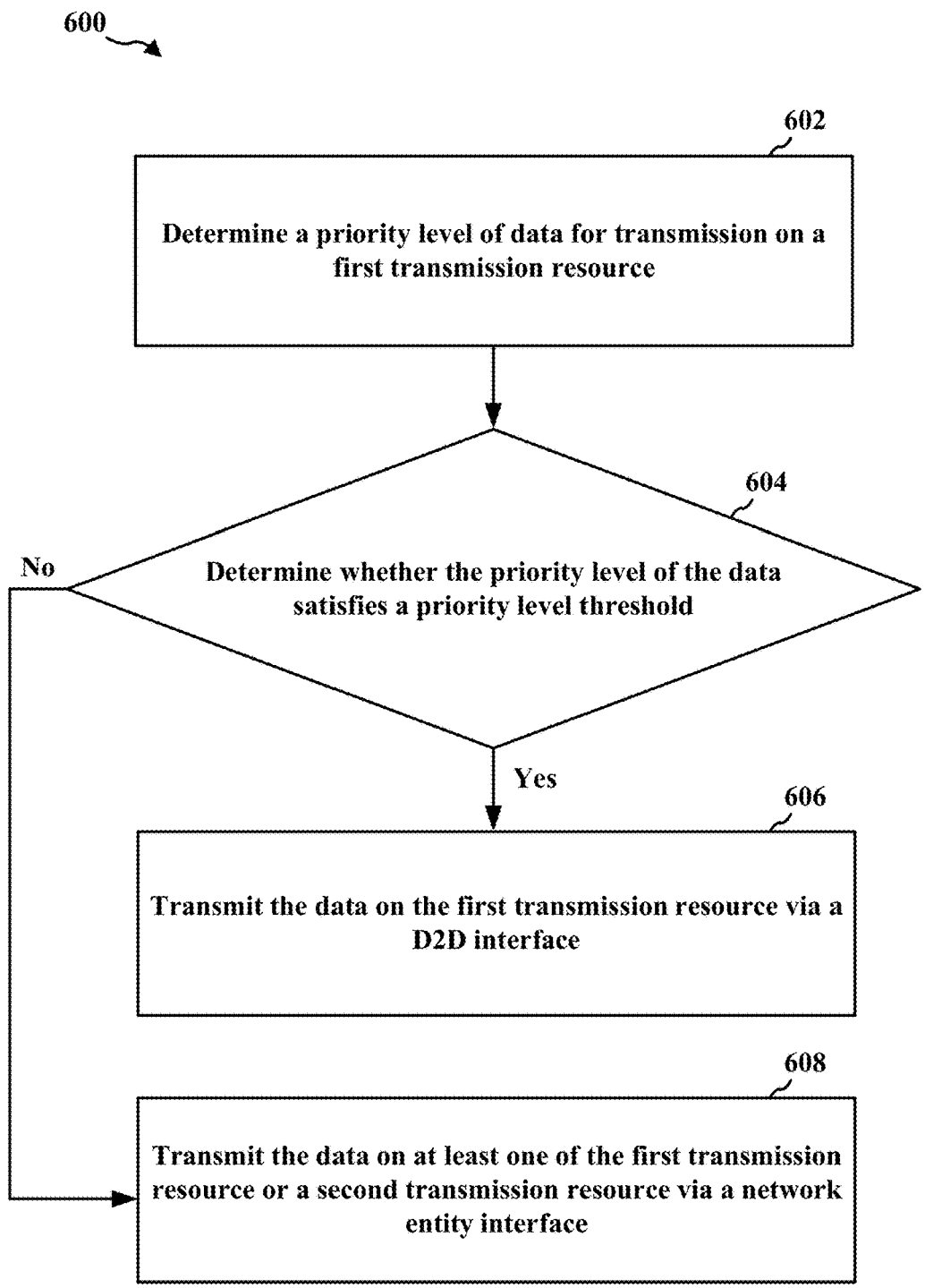
FIG. 6 is a flowchart of a method of resource transmission at a UE in accordance with some aspects of the present disclosure.

FIG. 6 is a flowchart 600 of a method of resource transmission at a UE. The method may be performed by a UE (e.g., UE 104, FIG. 1, UE 468', FIG. 4, and/or apparatus 802, FIG. 8). While, for purposes of simplicity of explanation, the method is shown and described as a series of acts, the method may not be limited by the order of acts, as some acts may, in accordance with one or more aspects, occur in different orders and/or concurrently with other acts from that shown and described herein. For example, a method could alternatively be represented as a series of interrelated states or events, such as in a state diagram. Moreover, not all illustrated acts may be required to implement a method in accordance with one or more features described herein.

At block 602, the method 600 may determine a priority level of data for transmission on a first transmission resource. For instance, in some aspects, the UE 468' (FIG. 4) may execute the resource selection component 410 (FIG. 4) to determine a priority level of data for transmission on a first transmission resource (e.g., from the set of transmission resources 412). For example, the priority level of the data at the UE 468' may be determined based a packet header, such as, in some aspects, a PDCP packet header.

Further, at block 604, the method 600 may determine whether the priority level of the data satisfies a priority level threshold. For example, in some aspects, the UE 468' (FIG. 4) may execute the resource selection component 410 (FIG. 4) to determine whether the priority level of the data satisfies a priority level threshold 428 (FIG. 4).

When the method 600 determines at block 604 that the priority level of the data satisfies the priority level threshold, the operation may proceed to block 606. At block 606, the method 600 may transmit the data on the first transmission resource via a D2D interface. For example, in some aspects, the UE 468' (FIG. 4) may execute one or more components of a transmission chain (e.g., TX processor 368, TX 354, and/or antenna 352, FIG. 3) to transmit the data on the first transmission resource via a D2D interface based on determining that the priority level of the data satisfies (meets or exceeds) the priority level threshold 428. In some aspects, the D2D interface may correspond to a PC5 interface.

When method 600 determines at block 604 that the priority level of the data does not satisfy the priority level threshold, operation proceeds to block 608. At block 608, the method 600 may transmit the data on at least one of the first transmission resource or a second transmission resource via a network entity interface. For instance, in some aspects, the UE 468' (FIG. 4) may execute one or more components of a transmission chain (e.g., TX processor 368, TX 354, and/or antenna 352, FIG. 3) to transmit the data on at least one of the first transmission resource or a second transmission resource via a network entity interface based on determining that the priority level of the data does not satisfy (meets or falls below) the priority level threshold 428. In some aspects, the network entity interface may correspond to a Uu interface.

Further, although not shown, the method 600 may include determining whether the second transmission resource satisfies one or more latency criteria. Further, in some aspects, transmitting the data the second transmission resource may include transmitting on the second transmission resource via the network entity interface includes transmitting based on determining that the second transmission resource satisfies one or more latency criteria.

In some aspects, although not shown, the method 600 may include receiving a configuration message from the network entity for configuring the priority level threshold 428 (FIG. 4). In some aspects, the configuration message may be received via at least one of a unicast transmission or a broadcast transmission.

Additionally, although not shown, the method 600 may include determining that transmission of the data on the first transmission resource via the D2D using a transmitter of the UE 468' (FIG. 4) conflicts with a transmission of different data via the network entity interface using the transmitter. In some aspects, the conflict may occur when the UE 468' (FIG. 4) may be planning to transmit on a subframe on the sidelink (e.g., using a D2D interface to another UE 470', FIG. 4) and/or may be scheduled by the network entity (e.g., eNodeB) to also do the same on the uplink. Accordingly, based on the foregoing, transmitting the data on the first transmission resource may include prioritizing transmission of the data on the first transmission resource via the D2D interface over transmission of the different data via the network entity interface based on determining that the priority level of the data satisfies the priority level threshold 428 (FIG. 4).

In some aspects, transmitting the data on the first transmission resource may include transmitting the data on a synchronization channel based on determining that the priority level of the data satisfies the priority level threshold 428 (FIG. 4).

Figure 7:
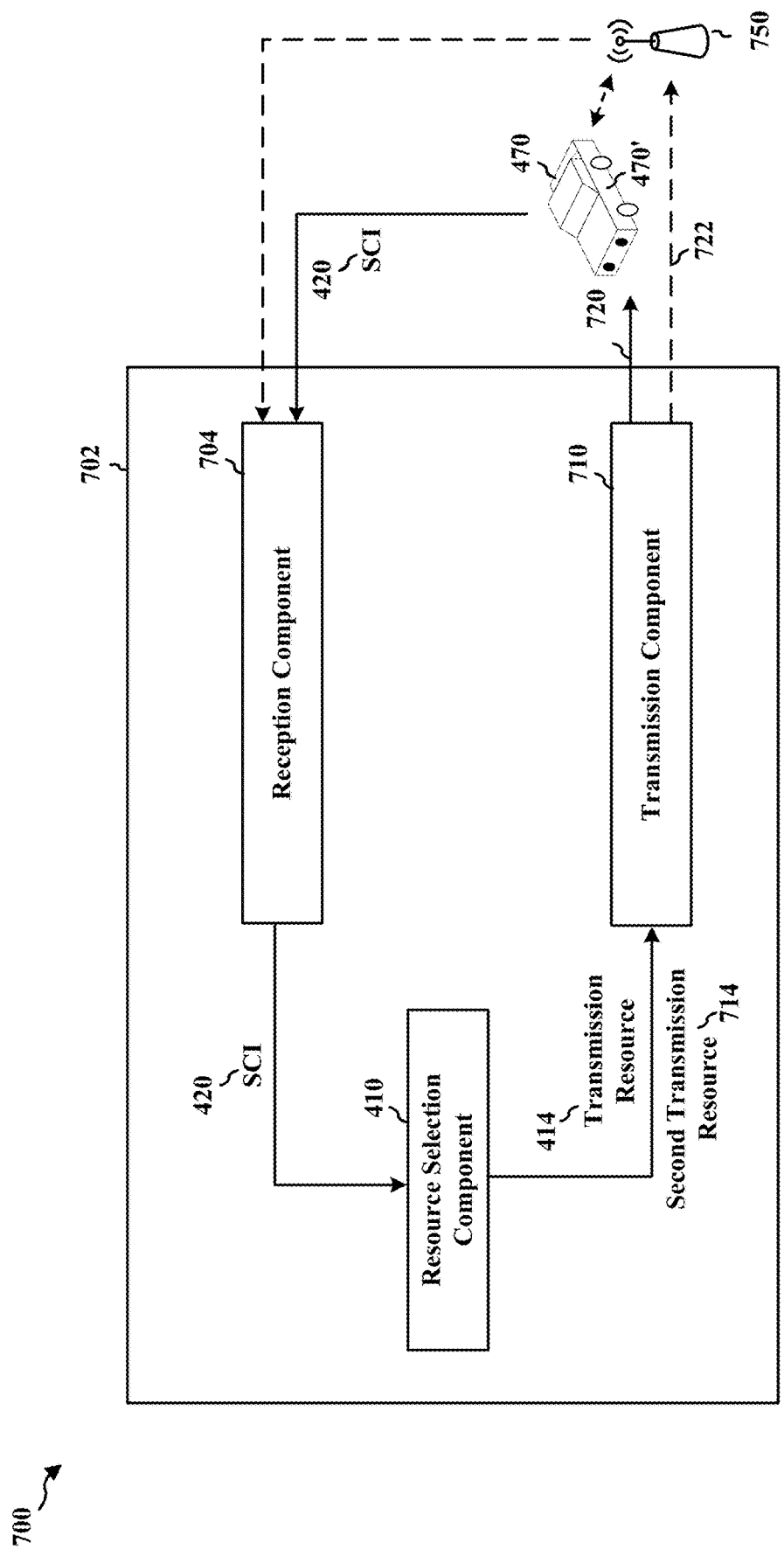
FIG. 7 is a conceptual data flow diagram illustrating the data flow between different means/components in an example apparatus according to some aspects of the present disclosure.

FIG. 7 is a conceptual data flow diagram 700 illustrating the data flow between different means/components in an example apparatus 702. The apparatus may be a UE such as the UE 468' (FIG. 4). The apparatus may include a reception component 704 that receives the SCI 420 including at least one scheduling assignment 422 (FIG. 4) and priority information 424 (FIG. 4), a resource selection component 410 that selects a transmission resource 414 for transmission of data (e.g., data packets) from a set of transmission resources 412 (FIG. 4) based on one or both of the at least one scheduling assignment 422 (FIG. 4) or the priority information 424 (FIG. 4), and a transmission component 710 that transmits the data on the selected transmission resource 414.

Further, in some aspects, the resource selection component 410 may determine a priority level of data for transmission on a first transmission resource (which may be the same as the transmission resource 414), and may determine whether the priority level of the data satisfies a priority level threshold 428 (FIG. 4). In some aspects, the transmission component 710 transmits the data on the first transmission resource (e.g., transmission resource 414) via a D2D interface 720 based on determining that the priority level of the data satisfies a priority level threshold 428 (FIG. 4), and transmits the data on at least one of the first transmission resource (e.g., transmission resource 414) or a second transmission resource 714 via a network entity interface 722 based on determining that the priority level of the data does not satisfy the priority level threshold 428 (FIG. 4).

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
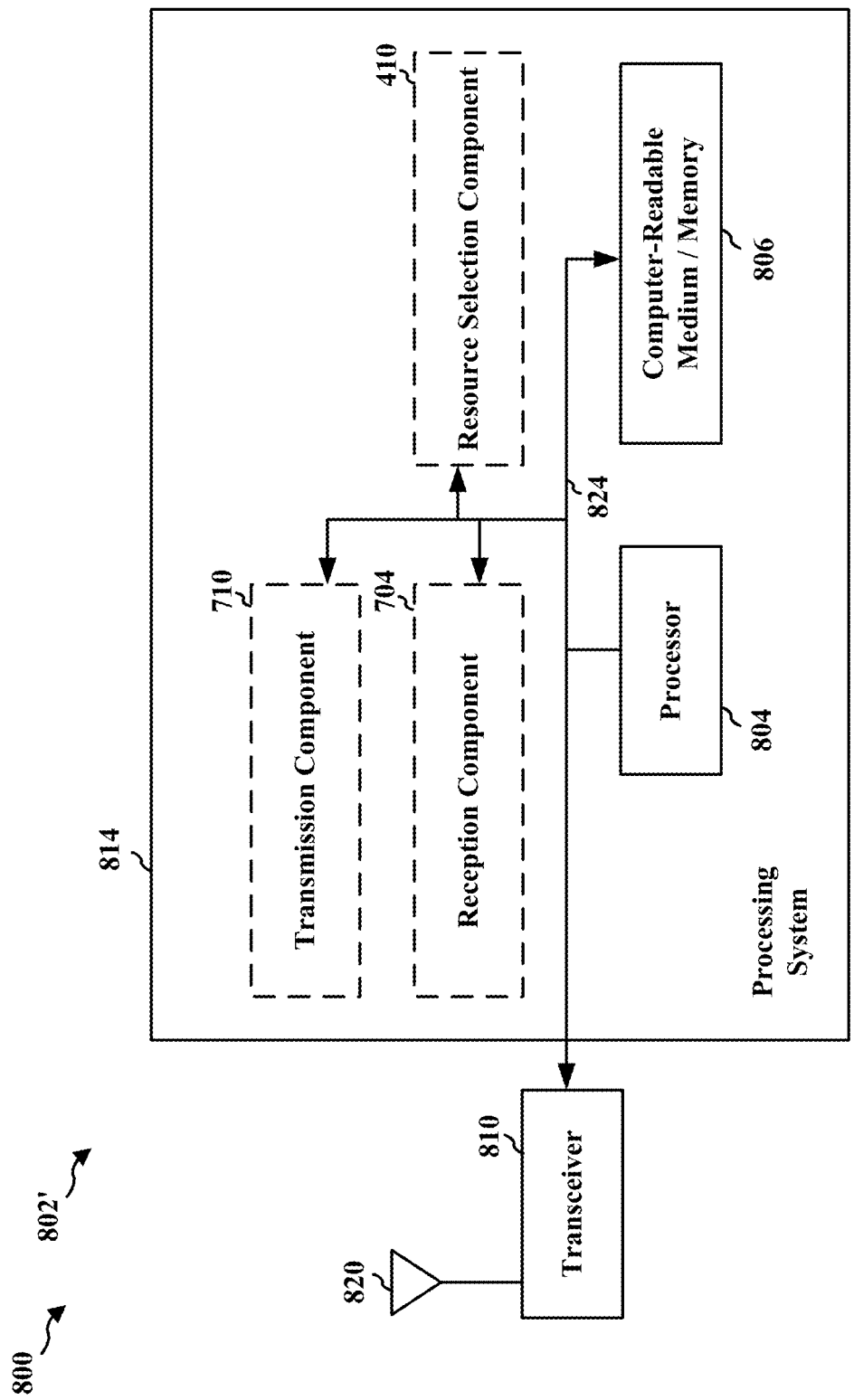
FIG. 8 is a diagram illustrating an example of a hardware implementation for an apparatus employing a processing system according to some aspects of the present disclosure.

FIG. 8 is a diagram 800 illustrating an example of a hardware implementation for an apparatus 802' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the reception component 704, the transmission component 710, the resource selection component 410, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 may be coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 710, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the reception component 704, the transmission component 710, the resource selection component 410. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 802/802' for wireless communication includes means for receiving SCI including at least one scheduling assignment and priority information. The apparatus 802/802' further includes means for selecting a transmission resource for transmission of data from a set of transmission resources based on one or both of the at least one scheduling assignment or the priority information. The apparatus 802/802' further includes means for transmitting the data on the selected transmission resource. The apparatus 802/802' further includes means for determining whether a first priority level associated with data of another UE and included within the priority information is higher than a priority level associated with the data of the UE. The apparatus 802/802' further includes means for determining a second priority level from the priority information and associated with a second transmission resource from the set of transmission resources. The apparatus 802/802' further includes means for transmitting an SCI associated with the UE in response to selecting the transmission resource. The apparatus 802/802' further includes means for selecting a second transmission resource from the set of transmission resources after expiration of the time interval.

Additionally, the apparatus 802/802' for resource transmission includes means for determining a priority level of data for transmission on a first transmission resource. The apparatus 802/802' further includes means for determining whether the priority level of the data satisfies a priority level threshold. The apparatus 802/802' further includes means for transmitting the data on the first transmission resource via a D2D interface based on determining that the priority level of the data satisfies a priority level threshold. The apparatus 802/802' further includes means for transmitting the data on at least one of the first transmission resource or a second transmission resource via a network entity interface based on determining that the priority level of the data does not satisfy the priority level threshold. The apparatus 802/802' further includes means for determining whether the second transmission resource satisfies one or more latency criteria. The apparatus 802/802' further includes means for receiving a configuration message from the network entity for configuring the priority level threshold. The apparatus 802/802' further includes means for determining that transmission of the data on the first transmission resource via the D2D interface using a transmitter of the UE conflicts with a transmission of different data via the network entity interface using the transmitter The aforementioned means may be one or more of the aforementioned components of the apparatus 802 and/or the processing system 814 of the apparatus 802' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:
1. A method of wireless communication at a user equipment (UE), comprising:
  receiving sidelink control information (SCI) including at least one scheduling assignment and priority information, wherein the priority information comprises a first priority level associated with data of another UE, the first priority level is a priority level of a set of priority levels, and each priority level of the set of priority levels corresponds to a distinct energy threshold;
  selecting a transmission resource for transmission of data from a set of transmission resources based on one or both of the at least one scheduling assignment or the priority information, comprising:
    determining an energy level of at least one of the transmission resource or the at least one scheduling assignment;
    determining the energy threshold corresponding to the first priority level; and
    determining that the energy level of at least one of the transmission resource or the at least one scheduling assignment is below the energy threshold corresponding to the first priority level;
  and
  transmitting the data on the selected transmission resource.

2. The method of claim 1, wherein the energy level corresponds to at least one of a reference signal power level or an estimated energy in the transmission resource.

3. The method of claim 1, wherein selecting the transmission resource for transmission of the data based on determining that the energy level satisfies the energy threshold includes selecting the transmission resource irrespective of the first priority level exceeding a priority level of the UE.

4. The method of claim 1, further comprising determining a second priority level from the priority information and associated with a second transmission resource from the set of transmission resources, wherein selecting the transmission resource is further based at least on the second priority level.

5. The method of claim 4, wherein at least one of the first priority level or the second priority level corresponds to a maximum priority level associated with another UE.

6. The method of claim 4, wherein at least one of the first priority level or the second priority level corresponds to a minimum priority level associated with another UE.

7. The method of claim 1, wherein the set of transmission resources corresponds to a physical sidelink shared channel (PSSCH) pool.

8. The method of claim 1, further comprising transmitting an SCI associated with the UE in response to selecting the transmission resource.

9. The method of claim 8, wherein the SCI is transmitted to one or more UEs on a PSCCH.

10. The method of claim 1, wherein the transmission resource is selected for a time interval, the method further comprising:
selecting a second transmission resource from the set of transmission resources after expiration of the time interval.

11. The method of claim 1, wherein transmitting the data on the transmission resource includes transmitting the data on a physical sidelink shared channel (PSSCH).

12. The method of claim 1, wherein selecting the transmission resource includes autonomously selecting the transmission resource from the set of transmission resources independent of a network entity.

13. The method of claim 12, wherein the network entity is an evolved Node B.

14. The method of claim 1, wherein selecting the transmission resource from the set of transmission resources includes selecting during at least one of a radio resource control (RRC) idle state or an RRC connected state of the UE.

15. The method of claim 1, wherein the UE is integrated within a vehicle.

16. The method of claim 1, further comprising determining whether a first priority level associated with data of another UE and included within the priority information is higher than a priority level associated with the data of the UE, wherein selecting the transmission resource includes:
selecting the transmission resource for transmission of the data of the UE based on determining that the first priority level is lower than the priority level of the UE; and
foregoing selection of the transmission resource for transmission of the data by the UE based on determining that the first priority level is higher than the priority level of the UE.

17. A method of resource transmission at a user equipment (UE), comprising:
determining a priority level of data for transmission on a first transmission resource;
determining whether the priority level of the data satisfies a priority level threshold;
transmitting the data on the first transmission resource via a device-to-device (D2D) interface based on determining that the priority level of the data satisfies the priority level threshold; and
transmitting the data on at least one of the first transmission resource or a second transmission resource via a network entity interface based on determining that the priority level of the data does not satisfy the priority level threshold, wherein the network entity interface is different than the D2D interface.

18. The method of claim 17, further comprising determining whether the second transmission resource satisfies one or more latency criteria,
wherein transmitting the data on the second transmission resource includes transmitting on the second transmission resource via the network entity interface includes transmitting based on determining that the second transmission resource satisfies the one or more latency criteria.

19. The method of claim 17, further comprising receiving a configuration message from a network entity for configuring the priority level threshold.

20. The method of claim 19, wherein the configuration message is received via at least one of a unicast transmission or a broadcast transmission.

21. The method of claim 17, further comprising:
determining that transmission of the data on the first transmission resource via the D2D interface using a transmitter of the UE conflicts with a transmission of different data via the network entity interface using the transmitter,
wherein transmitting the data on the first transmission resource includes prioritizing transmission of the data on the first transmission resource via the D2D interface over transmission of different data via the network entity interface based on determining that the priority level of the data satisfies the priority level threshold.

22. The method of claim 21, wherein transmitting the data on the first transmission resource includes transmitting on a synchronization channel based on determining that the priority level of the data satisfies the priority level threshold.

23. The method of claim 17, wherein the D2D interface corresponds to a PC5 interface.

24. The method of claim 17, wherein the network entity interface corresponds to a Uu interface.

25. The method of claim 17, wherein the UE is integrated within a vehicle.

26. An apparatus for wireless communication, comprising:
means for receiving sidelink control information (SCI) including at least one scheduling assignment and priority information, wherein the priority information comprises a first priority level associated with data of another UE, the first priority level is a priority level of a set of priority levels, and each priority level of the set of priority levels corresponds to a distinct energy threshold;
means for selecting a transmission resource for transmission of data from a set of transmission resources based on one or both of the at least one scheduling assignment or the priority information, the means for selecting the transmission resource being configured to:
determine an energy level of at least one of the transmission resource or the at least one scheduling assignment;

determine the energy threshold corresponding to the first priority level; and determine that the energy level of at least one of the transmission resource or the at least one scheduling assignment is below the energy threshold corresponding to the first priority level; and means for transmitting the data on the selected transmission resource.

27. An apparatus for resource transmission, comprising:
means for determining a priority level of data for transmission on a first transmission resource;
means for determining whether the priority level of the data satisfies a priority level threshold;
means for transmitting the data on the first transmission resource via a device-to-device (D2D) interface based on determining that the priority level of the data satisfies the priority level threshold; and
means for transmitting the data on at least one of the first transmission resource or a second transmission resource via a network entity interface based on determining that the priority level of the data does not satisfy the priority level threshold, wherein the network entity interface is different than the D2D interface.

28. A non-transitory computer-readable medium storing computer executable code for wireless communication, comprising code for:
receiving sidelink control information (SCI) including at least one scheduling assignment and priority information, wherein the priority information comprises a first priority level associated with data of another UE, the first priority level is a priority level of a set of priority levels, and each priority level of the set of priority levels corresponds to a distinct energy threshold;
selecting a transmission resource for transmission of data from a set of transmission resources based on one or both of the at least one scheduling assignment or the priority information, comprising:
determining an energy level of at least one of the transmission resource or the at least one scheduling assignment;
determining the energy threshold corresponding to the first priority level; and
determining that the energy level of at least one of the transmission resource or the at least one scheduling assignment is below the energy threshold corresponding to the first priority level; and
transmitting the data on the selected transmission resource.

29. A non-transitory computer-readable medium storing computer executable code for resource transmission, comprising code for:
determining a priority level of data for transmission on a first transmission resource;
determining whether the priority level of the data satisfies a priority level threshold;
transmitting the data on the first transmission resource via a device-to-device (D2D) interface based on determining that the priority level of the data satisfies the priority level threshold; and
transmitting the data on at least one of the first transmission resource or a second transmission resource via a network entity interface based on determining that the priority level of the data does not satisfy the priority level threshold, wherein the network entity interface is different than the D2D interface.

30. An apparatus for wireless communication, comprising:
a memory; and
at least one processor communicatively coupled to the memory and configured to:
receive sidelink control information (SCI) including at least one scheduling assignment and priority information, wherein the priority information comprises a first priority level associated with data of another UE, the first priority level is a priority level of a set of priority levels, and each priority level of the set of priority levels corresponds to a distinct energy threshold;
select a transmission resource for transmission of data from a set of transmission resources based on one or both of the at least one scheduling assignment or the priority information, comprising:
determining an energy level of at least one of the transmission resource or the at least one scheduling assignment;
determining the energy threshold corresponding to the first priority level; and
determining that the energy level of at least one of the transmission resource or the at least one scheduling assignment is below the energy threshold corresponding to the first priority level; and
transmit the data on the selected transmission resource.

31. The apparatus of claim 30, wherein the energy level corresponds to at least one of a reference signal power level or an estimated energy in the transmission resource.

32. The apparatus of claim 30, wherein to select the transmission resource for transmission of the data based on determining that the energy level satisfies the energy threshold, the at least one processor is further configured to select the transmission resource irrespective of the first priority level exceeding a priority level of the UE.

33. The apparatus of claim 30, wherein the at least one processor is further configured to determine a second priority level from the priority information and associated with a second transmission resource from the set of transmission resources, wherein the transmission resource is selected based at least on the second priority level.

34. The apparatus of claim 33, wherein at least one of the first priority level or the second priority level corresponds to a maximum priority level associated with another UE.

35. The apparatus of claim 33, wherein at least one of the first priority level or the second priority level corresponds to a minimum priority level associated with another UE.

36. The apparatus of claim 30, wherein the set of transmission resources corresponds to a physical sidelink shared channel (PSSCH) pool.

37. The apparatus of claim 30, wherein the at least one processor is further configured to transmit an SCI associated with the UE in response to selecting the transmission resource.

38. The apparatus of claim 37, wherein the SCI is transmitted to one or more UEs on a PSCCH.

39. The apparatus of claim 30, wherein the transmission resource is selected for a time interval, and wherein the at least one processor is further configured to:
select a second transmission resource from the set of transmission resources after expiration of the time interval.

40. The apparatus of claim 30, wherein to transmit the data on the transmission resource, the at least one processor is further configured to transmit the data on a physical sidelink shared channel (PSSCH).

41. The apparatus of claim 30, wherein to select the transmission resource, the at least one processor is further configured to autonomously select the transmission resource from the set of transmission resources independent of a network entity.

42. The apparatus of claim 41, wherein the network entity is an evolved Node B.

43. The apparatus of claim 30, wherein to select the transmission resource from the set of transmission resources, the at least one processor is further configured to select during at least one of a radio resource control (RRC) idle state or an RRC connected state of the UE.

44. The apparatus of claim 30, wherein the UE is integrated within a vehicle.

45. The apparatus of claim 30, wherein the at least one processor is further configured to determine whether a first priority level associated with data of another UE and included within the priority information is higher than a priority level associated with the data of the UE, wherein to select the transmission resource, the at least one processor is further configured to:
  select the transmission resource for transmission of the data of the UE based on determining that the first priority level is lower than the priority level of the UE; and
  forego selection of the transmission resource for transmission of the data by the UE based on determining that the first priority level is higher than the priority level of the UE.

46. An apparatus for resource transmission, comprising:
a memory; and
at least one processor communicatively coupled to the memory and configured to:
  determine a priority level of data for transmission on a first transmission resource;
  determine whether the priority level of the data satisfies a priority level threshold;
  transmit the data on the first transmission resource via a device-to-device (D2D) interface based on determining that the priority level of the data satisfies the priority level threshold; and
  transmit the data on at least one of the first transmission resource or a second transmission resource via a network entity interface based on determining that the priority level of the data does not satisfy the priority level threshold, wherein the network entity interface is different than the D2D interface.

47. The apparatus of claim 46, wherein the at least one processor is further configured to determine whether the second transmission resource satisfies one or more latency criteria, and
  wherein to transmit the data on the second transmission resource, the at least one processor is further configured to transmit on the second transmission resource via the network entity interface includes transmitting based on determining that the second transmission resource satisfies the one or more latency criteria.

48. The apparatus of claim 46, wherein the at least one processor is further configured to receive a configuration message from a network entity for configuring the priority level threshold.

49. The apparatus of claim 48, wherein the configuration message is received via at least one of a unicast transmission or a broadcast transmission.

50. The apparatus of claim 46, wherein the at least one processor is further configured to:
  determine that transmission of the data on the first transmission resource via the D2D interface using a transmitter of the UE conflicts with a transmission of different data via the network entity interface using the transmitter,
  wherein to transmit the data on the first transmission resource, the at least one processor is further configured to prioritize transmission of the data on the first transmission resource via the D2D interface over transmission of different data via the network entity interface based on determining that the priority level of the data satisfies the priority level threshold.

51. The apparatus of claim 50, wherein to transmit the data on the first transmission resource, the at least one processor is further configured to transmit on a synchronization channel based on determining that the priority level of the data satisfies the priority level threshold.

52. The apparatus of claim 46, wherein the D2D interface corresponds to a PC5 interface.

53. The apparatus of claim 46, wherein the network entity interface corresponds to a Uu interface.

54. The apparatus of claim 46, wherein the UE is integrated within a vehicle.

* * * * *